UNITED STATES PATENT OFFICE.

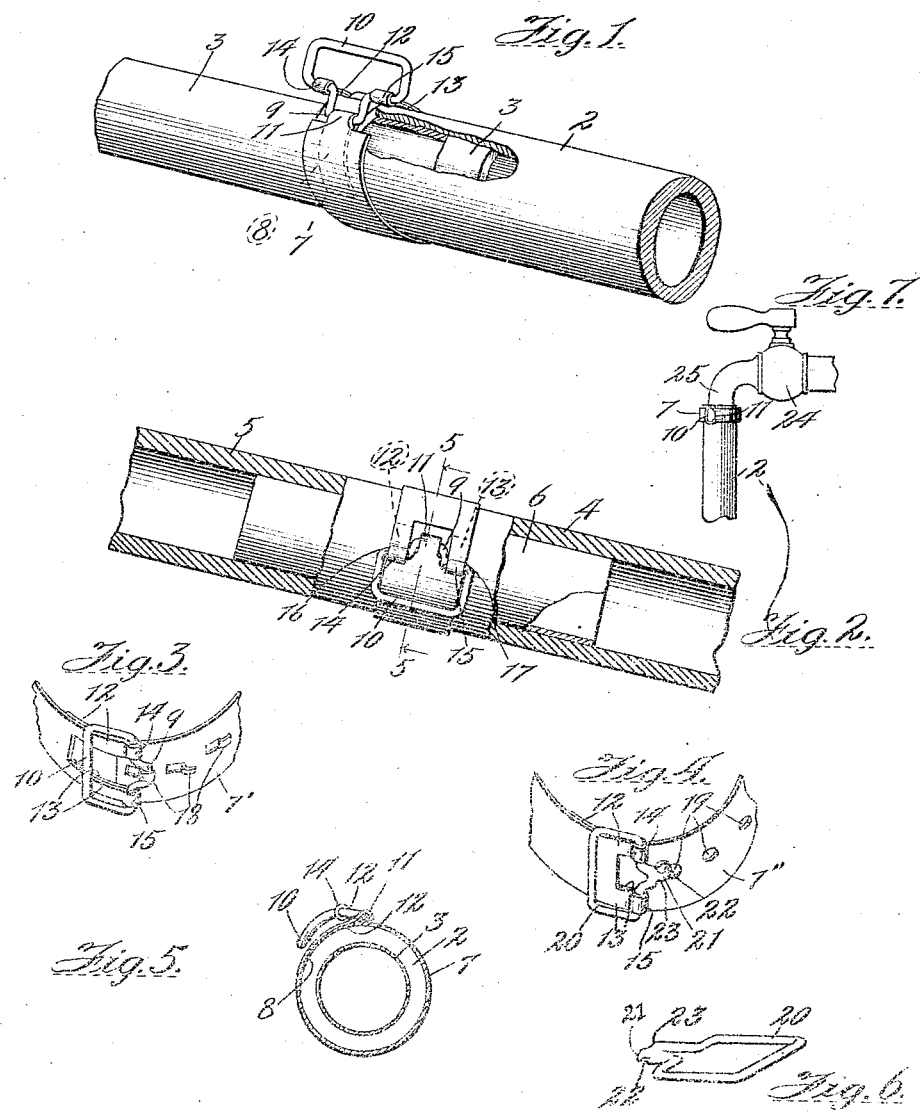

SVEN MALCOLM JOHNSON, OF CHICAGO, ILLINOIS.

HOSE AND PIPE COUPLING.

941,150.     Specification of Letters Patent.     Patented Nov. 23, 1909.

Application filed July 20, 1907. Serial No. 384,817.

*To all whom it may concern:*

Be it known that I, SVEN M. JOHNSON, a subject of King Oscar of Sweden, and a resident of Chicago, in the county of Cook and State of Illinois, have invented certain new and useful Improvements in Hose and Pipe Couplings, of which the following is a specification.

My invention relates to couplings and has particular reference to means for coupling a section of hose, or flexible pipe, to a metal pipe, bib of a water cock, and the like.

The object of my invention is to provide a simple, inexpensive and efficient coupling for this purpose, and with this object in view the invention consists in the novel construction and combination of parts hereinafter described in detail, illustrated in the drawing and incorporated in the claim.

In the drawing—Figure 1 is a perspective view of a piece of hose, partly broken away, and a piece of metal pipe with my invention applied thereto, the coupling being released. Fig. 2 shows two pieces of hose and a pipe therein, partly in section and partly broken away and the clamp of the coupling shown in its closed position. Fig. 3 is a perspective view of a section of the clasp or band and lever-clamp therefor. Fig. 4 shows a modification of the construction shown in Fig. 3. Fig. 5 is a section taken on line 5—5 of Fig. 2. Fig. 6 is a perspective view of a detail taken from Fig. 4. Fig. 7 is a view of a faucet having a piece of hose applied thereto with the aid of my invention.

Referring in detail to the several views, 2 represents a piece of hose; 3, a section of pipe inserted; 4 and 5, two sections of rubber hose, and 6, a piece of tubing inserted into and joining the sections of hose 4 and 5.

In Fig. 1 the tube 3 is inserted in the end of the hose 2 and a coupling contracts the hose on the tube. This coupling, in the construction shown in said Fig. 1, consists of a metal strap, or open band 7 on one end of which is formed a tongue or strip 8 which is bent around the hinge portion 9 of a wire-loop constituting a lever 10. The strip or tongue 8 is bent upon the inner side of the band 7 so that when the band is tightened, as will hereinafter be explained, the part 8 will be tightly held between the band and the hose. The frictional engagement of the hold thus obtained upon the part 8 assists the bend, or hinge-portion, 11 of the tongue 8, in resisting an opening of the bend or loop 11 under the strain of tightening the band 7 upon the hose 2 and pipe 3. The bend 11 may be made upon any portion of the part 8 leaving sufficient of its free end beyond the bend to be engaged between the parts 7 and 2. In this variable formation of the bend 11 I make the band 7 adjustable to different sizes of hose. The opposite end of the band 7 terminates in two strips 12 and 13, which, at 14 and 15, are looped over inward bends 16 and 17 of the lever 10 and bent upon themselves exactly in the same manner as the strip 8 and can be lengthened or shortened with respect to the lever as and for the purpose of the strip 8.

In Fig. 3 the band 7' is shown provided with a modified construction for the purpose of carrying out the feature of adjustability provided for in the above-described part 8. This modified construction consists of punched out hooks 18 either of which may be engaged by the fulcrum portion 9 of the lever 10.

A still further modification is shown in Fig. 4 where the band 7" is provided with a series of holes 19 which take the place of the hooks 18 and strip 8. These holes may be successively engaged with the aid of a modified lever 20, the fulcrum portion 21 of which is in the form of a hook. Immediately in the rear of the hook 21 are shoulders 22 and 23 which engage the sides of an opening 19 and the entrance thereinto of more than the extreme end of the fulcrum portion or hook.

In Fig. 7 the faucet 24 is shown connected to the hose 2 in substantially the same manner as the pipe 3 in Fig. 1, the smooth bib 25 taking the place of the pipe 3. It is customary to attach short sections of hose to faucet bibs to either prevent splashing of water in a sink or wash basin, or to convey a stream of water into some vessel outside of the sink or basin. Even where the joint between hose 2 and bib 25 is not required to withstand water pressure and a close fit of the hose upon the bib is relied upon, the hose opening quickly becomes enlarged from frequent attachments and removals and needs a simple, inexpensive and instantly adjustable fastener or clamp.

The operation of the invention will be understood from a glance at Figs. 1 and 2. In Fig. 1 is shown open or swung back and the band 7 expanded by forcing the parts 14 and 15 away from the part 11, which parts are the ends of the hose-encircling clasp. In Fig. 2 the lever 10 is closed and band contracted by drawing the parts 14 and 15 past the part 11.

I claim as my invention—

The combination with a contractible tube and an interior pipe, of a plain metal strip having a single tongue 8 at one end and a pair of tongues 12 and 13 at the opposite end, a plain wire loop formed into a hinge portion 9 to be engaged by the tongue 8 and inward bends 16 and 17 to be engaged by the tongues 12 and 13, said single tongue 8 being loosely bent over said hinge portion 9 and thus adjustable over said hinge portion 9 to vary the operative length of the band, said loosely bent over tongue 8 being held by frictional engagement between said metal strip and said tube when said coupling is clamped upon said tube.

In testimony whereof I have hereunto set my hand in the presence of two subscribing witnesses.

SVEN MALCOLM JOHNSON.

Witnesses:
J. W. BECKSTROM,
M. C. ALLEN.